(12) United States Patent
Hazel et al.

(10) Patent No.: US 10,745,793 B2
(45) Date of Patent: Aug. 18, 2020

(54) CERAMIC COATING DEPOSITION

(71) Applicant: UNITED TECHNOLOGIES CORPORATION, Hartford, CT (US)

(72) Inventors: Brian T Hazel, Avon, CT (US); Mario P Bochiechio, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 603 days.

(21) Appl. No.: 14/730,466

(22) Filed: Jun. 4, 2015

(65) Prior Publication Data

US 2017/0016104 A1  Jan. 19, 2017

(51) Int. Cl.
| | | |
|---|---|---|
| *C23C 4/04* | (2006.01) | |
| *C23C 4/134* | (2016.01) | |
| *C23C 4/10* | (2016.01) | |
| *C04B 35/486* | (2006.01) | |
| *C04B 35/622* | (2006.01) | |
| *C04B 35/626* | (2006.01) | |
| *C04B 37/00* | (2006.01) | |
| *F01D 5/28* | (2006.01) | |

(Continued)

(52) U.S. Cl.
CPC ............... *C23C 4/04* (2013.01); *C04B 35/486* (2013.01); *C04B 35/62222* (2013.01); *C04B 35/62625* (2013.01); *C04B 37/001* (2013.01); *C23C 4/10* (2013.01); *C23C 4/134* (2016.01); *F01D 5/288* (2013.01); *F01D 9/041* (2013.01); *F01D 11/08* (2013.01); *C04B 2235/3224* (2013.01); *C04B 2235/3225* (2013.01); *C04B 2235/3246* (2013.01); *C04B 2235/3248* (2013.01); *C04B 2237/348* (2013.01); *F05D 2220/32* (2013.01); *F05D 2230/90* (2013.01); *F05D 2300/611* (2013.01)

(58) Field of Classification Search
CPC .................................. C23C 4/04; C23C 4/134
See application file for complete search history.

(56) References Cited

U.S. PATENT DOCUMENTS 6,491,967 B1 * 12/2002 Corderman ............. C23C 16/04
427/446
8,629,371 B2   1/2014 Oberste-Berghaus et al.
(Continued)

FOREIGN PATENT DOCUMENTS

EP       2781616 A1    9/2014
KR    101398884 B1    5/2014
(Continued)

OTHER PUBLICATIONS

European Extended Search Report dated Sep. 28, 2016, issued in the corresponding European Patent Application No. 16172915.7.
(Continued)

*Primary Examiner* — Dah-Wei D. Yuan
*Assistant Examiner* — Nga Leung V Law
(74) *Attorney, Agent, or Firm* — Bachman & LaPointe, P.C.

(57) ABSTRACT

A ceramic coating process comprises introducing a suspension including a fine ceramic particulate suspended in a liquid carrier into a plasma torch. The method includes melting the fine ceramic particulate in the plasma torch; propelling the fine ceramic particulate toward a substrate; and forming a coating on the substrate, the coating comprises splats of the fine ceramic particulate.

14 Claims, 1 Drawing Sheet

(51) Int. Cl.
*F01D 9/04* (2006.01)
*F01D 11/08* (2006.01)

(56) References Cited

U.S. PATENT DOCUMENTS

| | | | |
|---|---|---|---|
| 9,920,417 B2 | 3/2018 | Porob et al. | |
| 2006/0222777 A1 | 10/2006 | Skoog et al. | |
| 2011/0244216 A1 | 10/2011 | Meyer et al. | |
| 2013/0095340 A1* | 4/2013 | Sivakumar | C23C 4/02 428/548 |
| 2013/0224453 A1* | 8/2013 | Hazel | C23C 4/02 428/212 |
| 2013/0260132 A1* | 10/2013 | Hazel | C23C 28/042 428/304.4 |
| 2014/0178641 A1 | 6/2014 | Leblanc et al. | |
| 2014/0220324 A1 | 8/2014 | Strock et al. | |
| 2014/0220378 A1 | 8/2014 | Nagaraj et al. | |
| 2014/0287149 A1 | 9/2014 | Zimmermann et al. | |
| 2015/0147524 A1 | 5/2015 | Petorak | |
| 2015/0329954 A1* | 11/2015 | Quet | B05D 1/34 428/220 |
| 2016/0186580 A1 | 6/2016 | Zaleski et al. | |
| 2016/0347671 A1 | 12/2016 | Strock | |

FOREIGN PATENT DOCUMENTS

| | | | |
|---|---|---|---|
| WO | 9305194 A1 | 3/1993 | |
| WO | 2013130265 A1 | 9/2013 | |
| WO | WO 2014095887 A1 * | 6/2014 | B05D 1/34 |

OTHER PUBLICATIONS

European Office Action for Application No. 16 172 915.7 dated May 18, 2018.

U.S. Office Action dated Jan. 10, 2019 for related U.S. Appl. No. 15/449,129.

* cited by examiner

CERAMIC COATING DEPOSITION

BACKGROUND

The present disclosure relates generally to methods for coating a surface and more particularly is directed to a ceramic coating process.

Conventional thermal spray processes use powders with particle size ranging from 10 to 100 µm. They result in coatings that mainly present micrometer-sized features. The features are the result of the lamellae formed by the impact of the particles onto the substrate. These lamellae are a few micrometers (µm) thick with a diameter ranging from a few tens to a few hundreds of micrometers.

Coatings can obtain enhanced properties by utilization of nanometer-sized particles as compared to micrometer-sized ones. Reducing the structure scale down to a nanometer allows, increasing strength, improving toughness and while reducing apparent density, elastic modulus, and apparent thermal conductivity, among other improvements.

One of the major drawbacks in processing nanometer-sized particles by thermal spraying is the difficulty in injecting them in the core of the high enthalpy flow, since the particle injection force has to be of the same order as that imparted by the gas flow. Additionally, conveying fine ceramic powders less than 10 µm through traditional thermal spray powder feeders is challenging due to effects of humidity and electrostatic charging of the powder during transport. Both of these mechanisms, and others, can lead to the clogging of the powder feed line to the thermal spray torch. Thus, it is not practically possible to inject particles with sizes below 5-10 µm.

Possibilities exist to circumvent these drawbacks through the use of a carrier medium by which powders can be brought to the thermal spray torch and injected into the high energy gas flow of the thermal spray torch.

SUMMARY

In accordance with the present disclosure, there is provided an improved process that employs a Suspension Plasma Spray (SPS) method that introduces a fine ceramic particulate (usually submicron) in a liquid carrier (e.g. ethanol) into a plasma torch that melts the powders and propels them toward a substrate forming a coating by the buildup of fine ceramic particular splats.

In accordance with the present disclosure, there is provided a ceramic coating process comprising introducing a suspension including a fine ceramic particulate suspended in a liquid carrier into a plasma torch, comprising at least one of co-spraying at least two dissimilar suspensions at the same time (simultaneously) or in series; spraying a single suspension composed of dissimilar fine ceramic particulate, and co-spraying at least one of a suspension and at least one dry powder into the plasma torch wherein the dry powder is larger than the fine ceramic particulate; melting the fine ceramic particulate in the plasma torch; propelling the fine ceramic particulate toward a substrate wherein the fine ceramic particulate comprises a submicron size; and forming a coating on the substrate, the coating comprising splats of the fine ceramic particulate.

In another and alternative embodiment the process further comprises forming at least one liquid droplet comprising multiple fine ceramic particulate wherein the liquid has vaporized and the multiple fine ceramic particulate has agglomerated into a single particulate.

In another and alternative embodiment during melting of the fine ceramic particulate in the plasma torch, the fine ceramic particulate are at least one of semi-molten and molten so that there is not complete mixing of the fine ceramic particulate.

In another and alternative embodiment the process further comprises vaporizing the liquid carrier in the plasma torch.

In another and alternative embodiment the process includes forming at least one boundary between the fine ceramic particulate; and forming at least one boundary between the splats of the fine ceramic particulate.

In another and alternative embodiment the process includes controlling a thickness of individual dissimilar materials of the fine ceramic particulate between the at least one boundary found in the coating applied by co-spraying at least two dissimilar suspensions in series; wherein the controlling step comprises controlling at least one of a suspension feed rate, a suspension particulate loading, a traverse speed of the deposition pass over the substrate and a number of passes over the substrate.

In another and alternative embodiment the process includes controlling a thickness of individual dissimilar materials of the fine ceramic particulate between the at least one boundary found in the coating applied by the co-spraying at least two dissimilar suspensions simultaneously; wherein the controlling step comprises controlling at least one of a suspension feed rate, a suspension particulate loading, and liquid carrier selection.

In another and alternative embodiment the process includes controlling a thickness of individual dissimilar materials of the fine ceramic particulate between the at least one boundary found in the coating applied by spraying a single suspension composed of dissimilar fine ceramic particulate; wherein the controlling step comprises controlling at least one of an individual solids loading of each fine ceramic particulate and controlling a particle size of each fine ceramic particulate.

In another and alternative embodiment the process further comprise controlling the particle size of each fine ceramic particulate by varying the particle size from about 10 nm to about 5 microns.

In another and alternative embodiment the process further comprises controlling a thickness of individual dissimilar materials of the fine ceramic particulate between the at least one boundary found in the coating applied by co-spraying at least one suspension and at least one dry powder into the plasma torch; wherein the controlling step comprises controlling at least one of a suspension solids loading, a suspension feed rate, a dry powder feed rate, and a particle size of each fine ceramic particulate in the suspension and/or the dry powder.

In another and alternative embodiment the process further comprises forming at least one boundary between the splats of the fine ceramic particulate.

In another and alternative embodiment the coating comprises a structure, the structure comprising at least one of a porous structure, a dense structure having vertical cracks, a near fully dense structure, and a column structure.

In another and alternative embodiment the structure comprises a series of fine individual splats formed from the fine ceramic particulate.

In accordance with the present disclosure, there is provided an article comprising a substrate having a surface and a coating system coupled to the surface, the coating system comprising a structure, the structure comprising a series of individual splats formed from agglomerated fine ceramic particulate, wherein the series of individual splats comprises at least one of similar fine ceramic particulate and at least two dissimilar fine ceramic and dry powder particles introduced from dry powders; wherein the dry powder particles are larger than the fine ceramic particulate.

In accordance with the present disclosure, there is provided a component comprising a substrate having a surface; a coating system coupled to the surface; and the coating system comprising a first layer formed of a structure, the structure comprising a series of fine individual splats formed from fine ceramic particulate, wherein the series of fine individual splats are formed by at least one liquid droplet comprising multiple fine ceramic particulate that have combined into a single particulate.

In another and alternative embodiment the structure comprises at least one of a porous structure, a dense structure having vertical cracks, a near fully dense structure, and a column structure.

In another and alternative embodiment the component further comprises a second layer coupled to the first layer opposite the surface; the second layer comprising a second structure, the second structure comprising a series of fine individual splats formed from at least one of the same fine ceramic particulate as in the first layer and a different fine ceramic particulate from the first layer.

In another and alternative embodiment the coating system comprises a first layer formed by the structure, a second layer coupled to the first layer opposite the surface; the second layer comprising a second structure, the second structure comprising a series of fine individual splats formed from at least one of the same fine ceramic particulate as in the first layer and a different fine ceramic particulate from the first layer.

In another and alternative embodiment the component further comprises multiple layers, the multiple layers comprising the same composition of the first layer and the second layer in alternating series.

In another and alternative embodiment the at least one liquid droplet comprising multiple fine ceramic particulate, wherein the liquid has vaporized and the multiple fine ceramic particulate has agglomerated into the single particulate.

In another and alternative embodiment the component further comprises at least one of a bondcoat coupled to the surface of the substrate and an interfacial layer formed between the surface and the bond layer.

In another and alternative embodiment the coating comprises a thermal barrier coating.

In another and alternative embodiment the substrate is selected from the group consisting of hot section components such as combustor panels, turbine blades, turbine vanes, and blade outer air seals.

In accordance with the present disclosure, there is provided a process for coating a component, the process comprises configuring a plasma spray gun to target a surface of a substrate of the component; coupling at least a first coating material source to the spray gun; coupling at least a second coating material source to the spray gun; directing a plasma torch at the surface; introducing a suspension and a dry powder from at least one of the first coating material source and the second coating material source into the plasma torch, the suspension including a fine ceramic particulate suspended in a liquid carrier; spraying the component with the fine ceramic particulate and forming a coating on the surface of the substrate, the coating comprising splats of the fine ceramic particulate and dry particles introduced from dry powders, the dry particles being larger than the fine ceramic particulate, and alternatively wherein the liquid has vaporized and the fine ceramic particulate has agglomerated into a single particulate.

In another and alternative embodiment the coating comprises at least one of a first layer on the surface and a second layer coupled to the first layer opposite the surface.

In another and alternative embodiment the process further comprises spraying the first layer having a first composition from the first coating material source; spraying the second layer having a second composition from the second coating material source; and repeating the spraying alternatively to make a multi-layered structure.

In another and alternative embodiment the process further comprises co-spraying two dissimilar suspensions and the dry powders simultaneously or in series.

In another and alternative embodiment the process includes spraying at least one of the suspension and the dry powders, the suspension and the dry powders being composed of dissimilar particles.

In another and alternative embodiment the process further comprises spraying the suspension, the suspension being composed of dissimilar particles.

In another and alternative embodiment the process further comprises co-spraying the suspension and a dry powder.

In another and alternative embodiment the process further comprises varying a morphology of the splats by at least one of selecting the coating materials with different melting points and selecting the coating materials with different particle sizes and tailoring the plasma parameters to only one of the coating materials.

In another and alternative embodiment the process includes forming the coating by tailoring plasma parameters of the plasma torch responsive to the coating material.

In another and alternative embodiment the process further comprises varying a thickness of at least one of the first layer and the second layer by at least one of changing a total solids loading and a particle size in the suspension, individual feed rate of a suspension and changing a liquid carrier of the suspension.

In another and alternative embodiment, the Suspension Plasma Spray (SPS) method introduces a fine ceramic particulate (usually submicron) in a liquid carrier (e.g. ethanol) into a plasma torch that melts the powders and propels them toward a substrate forming a coating by the buildup of fine ceramic particular splats. Due to the size scale of the particulate, a range of coating structures can be formed from porous, dense with vertical cracks, near fully dense, and columnar structures. Each of these macro structures are composed of a series of fine individual splats from the individual particles (more likely liquid droplets with multiple particles that vaporizes and melts to form a single particle of a larger size—in the 1-2 micron range). The individual splats are about ~0.5 microns thick and ~5 microns wide.

Other details of the ceramic coating process are set forth in the following detailed description and the accompanying drawing wherein like reference numerals depict like elements.

DETAILED DESCRIPTION

Figure 1:
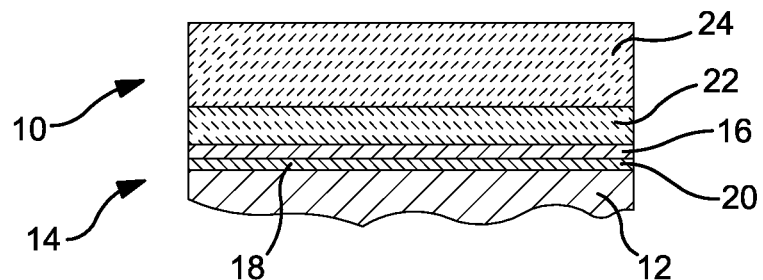
FIG. 1 is a partially schematic sectional view of substrate having a coating.

Referring now to FIG. 1 shows a coating system 10 atop a metallic substrate 12. In an exemplary embodiment, the substrate is a nickel-based superalloy or a cobalt-based superalloy such as a cast article or component 14 (e.g., a nickel-based single crystal casting) of a gas turbine engine. Exemplary components 14 are hot section components such as combustor panels, turbine blades, turbine vanes, and blade outer air seals.

The coating system 10 may include a bondcoat 16 layered on a surface 18 of the substrate 12. The bond coat 16 can embody a variety of thicknesses. One exemplary bond coat 16 thicknesses is in the range of 2 to 500 micrometers. Another exemplary bond coat 16 thickness is in the range of 12 to 250 micrometers. Yet another exemplary bond coat 16 thickness is in the range of 25 to 150 micrometers.

An interfacial layer 20 can be optionally formed at the interface of the bondcoat 16 and the substrate 12.

In an exemplary embodiment, the coating system 10 can include a multi-layer system with at least two layers. A first layer 22 is a lower layer. A second layer 24 is over the first layer 22. The first layer 22 can have different physical properties than the second layer 24.

The first layer 22 and second layer 24 can be applied to the component 14 using the same application technique and same equipment. An exemplary application technique includes a suspension plasma spray (SPS) technique. The SPS technique enables a mixture of dissimilar compositions on a fine scale that form a coating composition of multi-component ceramics.

Figure 2:
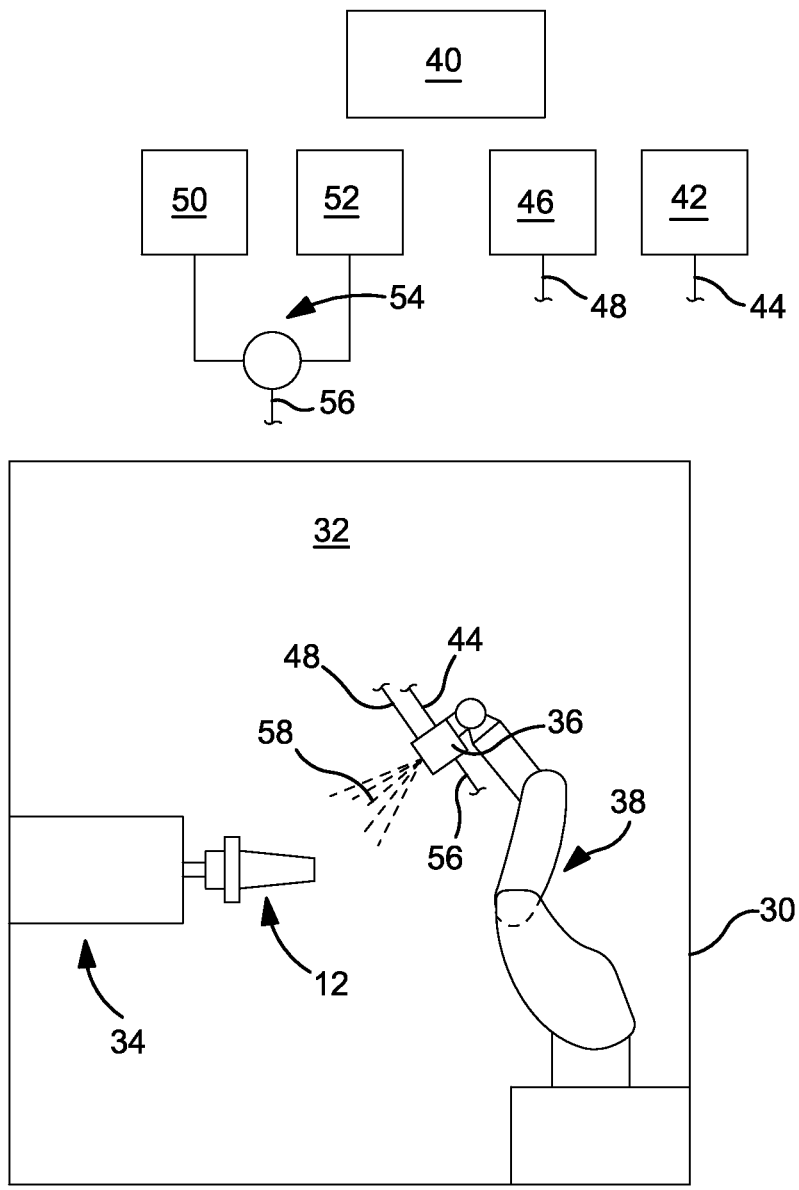
FIG. 2 is a partially schematic view of an apparatus for applying the coating to the substrate.

FIG. 2 is an exemplary apparatus for coating the substrate. FIG. 2 shows an exemplary chamber 30 having an interior 32 containing one or more substrates 12 held by a substrate holder 34 (which may hold the substrate(s) stationary or may move them (e.g., via rotation)). Alternative implementations may involve open-air spraying (without any chamber separate from the factory room in which spraying occurs). Exemplary spraying is at atmospheric pressure (e.g., nominally 101.3 kPa and usually at least 95 kPa). To perform the SPS process, the chamber contains a thermal spray gun 36. In the exemplary implementation, the gun is carried by an industrial robot 38. The gun, robot, substrate holder, and other controllable system components may be controlled via a controller 40 (e.g., a microcontroller, microcomputer, or the like) coupled to various system components and sensors and input/output devices. The controller 40 may have a processor, memory, and/or storage containing instructions for controlling operations such as discussed below. Communication with various controlled systems, sensors, and input/output devices may be via hardwiring or wireless communications. The controlled systems may further include a gun power source 42 coupled to the gun 36 via an electrical line 44, a gas source 46 coupled to the gun 36 via a gas line 48, and one or more coating material sources (an exemplary two: a first material source 50 and a second material source 52 being shown). Exemplary coating sources 50, 52 are coupled via a controllable valve 54 to a line 56 extending to the gun. The exemplary sources 50 and 52 respectively provide the first and second coating layers 22, 24. However, other configurations are possible including separate sources coupled to separate guns. In an alternative embodiment, there can be two separate sources supplied in separate feed lines and sprayed by separate nozzles in a single gun. There is no limit to the number of coating sources. FIG. 2 further shows the spray 58 discharged from the gun 36.

The gun 36 may be formed as an otherwise conventional spray plasma source with gas comprising an exemplary argon-helium, argon-hydrogen, or argon-hydrogen-nitrogen mixture. The suspension is injected into a plasma being discharged from the gun (via internal or external feed). As the spray passes from the point of injection to the substrate, the spray fragments into droplets (e.g., having a characteristic size in the vicinity of 3 micrometers at some point). Upon penetration in the plasma jet, drops or liquid jets are subjected to a strong shear stress due to the plasma flow which fragment them into smaller droplets, and are exposed to a very high heat flux that vaporizes the liquid of the suspension. During further traversal, the carrier tends to evaporate leading to agglomeration of the particles previously within the droplet and finally followed by melting of such agglomerated clusters of particles to form respective melt droplets which impact the substrate as splats.

In one exemplary SPS technique, a feedstock is dispersed as a suspension in a fluid, such as ethanol, and the fluid is injected wet into the gas stream. Splat sizes in the SPS technique with micron or submicron powder feedstock may be about ½ micron to about 3 microns in diameter and may include thicknesses of less than a micron. The resulting deposited layers have microstructural features that are much smaller than conventional plasma sprayed microstructures.

The exemplary implementation is performed via the first source 50. The exemplary first and second sources 50, 52 are liquid suspension feed systems. They store or have another supply of a suspension including a carrier such as ethanol with coating particles and dispersant. Exemplary coating particles are submicron particles in the vicinity of 300-1000 nanometers, more broadly, 50-2000 nanometers or 10-5000 nanometers at a weight concentration of 5-50% (more narrowly, 10-30 wt %). The exemplary dispersant is phosphate ester at a weight-concentration of 0.1-2%.

After application of the first layer, the second layer 24 is then applied. Exemplary application of the second layer 24 is performed in the same chamber as the application of the first layer 22. In particular embodiments, it is also via SPS and, more particularly, SPS using the same spray gun as was used in applying the first layer. This may be done by simply switching the powder being delivered to the gun 36 via one or more valves such as 54 switching from the first source 50 to the second source 54.

The exemplary embodiment of spraying the first layer 22 of one composition, such as material from material source 50, then changing and spraying a second composition from another material source 52 can be repeated to make a layered structure. This method limits the thickness of the individual layers primarily because it takes time to change from one injection material to the next.

A first example can include the application of a single layer of YSZ (yttria stabilized zirconia) which is applied directly to the surface 18 of the substrate 12, alternatively applied to the bondcoat 16 to form the first layer 22, then a single layer of GdZ (gadolinium zirconate) is applied as a second layer 24 over the first layer 22. These applications are repeated 10 times.

The thickness of individual layers can be changed by increasing the number of passes per layer or changing the solids loading on the suspension. Similarly the ratio of one layer to the other can be changed by the same methods. So, for example the first layer 22, can be twice the thickness as the second layer 24, vice versa and other combinations of ratios of thickness can be accomplished. A range for individual layers could be as low as ~1 micron, with no upper limit.

In another exemplary embodiment, the method can include a co-spray of two dissimilar suspensions simultaneously or in series. This method mixes the materials at the individual injection droplet size. A droplet includes more than one particle and is thus larger than a particle. In an exemplary embodiment, the gun 36 includes two injection points oriented in a radial fashion relative to the plasma source. The two injection points can be positioned at about 90° to each other separated from each other. In other exemplary embodiments the two injection points can be positioned at various radial angles. The injection points create two injection streams with a cross-over point at the center of the plasma flow. The structure that results from this embodiment, can constitute a single layer composed of many individual splats of dissimilar materials. In an alternative coating, an under-layer could be applied, comprising a homogeneous material, such as YSZ, with a layer of the co-sprayed dissimilar suspensions simultaneously applied over the under-layer. In another exemplary embodiment, an over-layer could be applied over the layer of the co-sprayed dissimilar suspensions simultaneously applied.

As an example, the process includes a co-spray of 6-8 wt % Yttria Stabilized Zirconia (YSZ) and Nyacol Al2O3. Both suspensions were injected at an equal rate. This exemplary process results in a layer formed from the mixture of the co-sprayed dissimilar suspensions.

Another example of the co-spray process includes a co-spray of a first suspension of YSZ and a second suspension of 5-60 mol % gadolinia balance zirconia. Both streams are injected at an equal rate.

Deployment of the co-spray process allows varying the thickness of individual layers by changing the solids loading or the choice of liquid carrier. This is due in part because the liquid carrier breakup physics defines the individual droplet size and therefore the layer size. Furthermore, the ratio of individual layers can be changed by changing the feed rate for each separate injection, the solids loading of each suspension, and the choice of liquid carrier of each suspension. Individual layers can be as low as ~0.1 micron.

In these exemplary methods, the morphology of one material's splats may be varied from the other material by selecting materials with significantly different melting points and tailoring the plasma parameters to only one of these materials. This could mean that one material forms typical splats as shown in these examples but the other material does not undergo significant melting and retains near its original particle shape. In an exemplary embodiment, a boundary can be formed between the particles, between the splats and between the splats and particles. These boundaries can be described as a compositional boundary and a structural boundary. A structural boundary is generally a physical feature in the coating such as the porosity or a lack of complete bonding. The boundary can impact the properties of the coating, such as thermal properties.

In another exemplary embodiment, the process can include spraying of a single suspension composed of dissimilar particles. This method mixes the materials at the individual particle size. Since multiple particles make up a single injection droplet, then this method could generate layering at a finer scale than the exemplary process described above.

An example of this process can include spraying of a mixed YSZ and Nyacol Al2O3. In this example, there are regions of unmelted particle clusters in the layer. Mixing of the ethanol based YSZ suspension with a water based Nyacol suspension can result in either agglomeration of some of the YSZ or incomplete droplet breakup in the flow, such that larger droplets can be formed and are not able to fully melt prior to impacting the component to form the layer.

Another example of spraying a single suspension composed of dissimilar particles includes spraying a mixed suspension including YSZ and GdZ. Both can be injected at an equal rate.

Within the process of spraying of a single suspension composed of dissimilar particles, the thickness of individual layers can be tailored by changing the total solids loading and the particle size. Furthermore, the ratio of individual layers can be changed by changing the solids loading of each material and the particle size for each material. For example, the suspension particle size can be varied from 10 s of nm to a few microns. The thickness of individual layers can be below 0.1 micron.

In another exemplary embodiment, the process can include co-spraying a suspension and a dry powder. In this embodiment the dry powder particles have a larger size than the particles in the suspension to facilitate feeding the materials. This method can use different particle sizes at injection to form a coating with a composite of different splat sizes and/or morphologies. The suspension and dry injections can further be of different materials to also vary chemistry in the coating. Dry injection can use powders down to ~5 microns. In another embodiment, the dry injection can use powders down to an average size of 20-50 microns.

Within the process of co-spraying a suspension and a dry powder, the thickness of individual layers or degree of mixing can be changed by changing the injection rate of both dry powder and suspension and the particle size of each. The morphology of one material's splats may be varied from the other material by selecting materials with significantly different melting points or significantly different particle sizes and tailoring the plasma parameters to only one of these materials. This could mean that one material forms typical splats as shown in these examples but the other material does not undergo significant melting and retains near its original particle shape.

The exemplary method is advantageous because the first layer may be applied via suspension plasma spray (SPS). SPS enables a mixture of dissimilar compositions on a fine scale that form a coating composition of multi-component ceramics because it relies on melting/softening of the ceramic and not vaporization during the transport to the substrate.

The exemplary coating process described herein that can mix dissimilar chemistries on the size scales defined herein can be deployed for dual phase strengthening of coatings. The process also has the advantage of decreasing thermal conductivity due to increased phonon scattering from dissimilar boundaries. The process creates boundaries between materials that can act as optical reflection surfaces. The exemplary coatings resulting from these coating processes can be employed in a variety of applications such as thermal barrier coatings for gas turbine engines.

There has been provided a ceramic coating system and process. While the ceramic coating system and process have been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:
1. A ceramic coating process comprising:
    introducing, from at least one material source, at least one suspension including at least one ceramic particulate suspended in a liquid carrier into a plasma torch, said plasma torch being emitted from a plasma spray gun, said plasma spray gun being fluidly connected to said at least one material source via a line that extends into said plasma spray gun, comprising:

spraying a single suspension composed of dissimilar ceramic particulates;

melting said at least one ceramic particulate in said plasma torch;

propelling said at least one ceramic particulate toward a substrate wherein said at least one ceramic particulate comprises at least one of a micron and a submicron size;

forming a coating on said substrate, said coating comprising splats of said at least one ceramic particulate;

forming at least one boundary between said ceramic particulate;

forming at least one boundary between said splats of said ceramic particulate; and controlling a thickness of individual dissimilar materials of said ceramic particulate between at least one boundary between said ceramic particulate found in the coating applied by spraying a single suspension composed of dissimilar ceramic particulate; said controlling comprising:

controlling at least one of an individual solids loading of each ceramic particulate and controlling a particle size of each ceramic particulate.

2. The process according to claim 1, further comprising:
forming at least one liquid droplet, the at least one liquid droplet comprising multiple ceramic particulate;
vaporizing the liquid carrier in said plasma torch; and
agglomerating said multiple ceramic particulate into a single particulate.

3. The process according to claim 1, wherein during said melting said ceramic particulate in said plasma torch, said ceramic particulate are at least one of semi-molten and molten so that there is incomplete mixing of said ceramic particulate.

4. The process according to claim 1, further comprising:
controlling at least one of a suspension feed rate, a suspension particulate loading, and liquid carrier selection.

5. The process according to claim 1 further comprising:
controlling said particle size of each ceramic particulate by varying said particle size from about 10 nm to about 5 microns.

6. The process according to claim 1, wherein said coating comprises a structure, said structure comprising at least one of a porous structure, a dense structure having vertical cracks, a dense structure, and a columnar structure.

7. The process according to claim 6, wherein said structure comprises a series of individual splats formed from the ceramic particulate.

8. A process for coating a component, said process comprising:
configuring a plasma spray gun to target a surface of a substrate of said component;
coupling at least a first coating material source to said plasma spray gun via a controllable valve to a line that extends into said plasma spray gun;
coupling at least a second coating material source to said plasma spray gun via said controllable valve to said line that extends into said plasma spray gun;
directing said plasma spray gun at said surface;
introducing two dissimilar suspensions and a dry powder from either one of said first coating material source or said second coating material source into said plasma spray gun, said two dissimilar suspensions including a ceramic particulate suspended in a liquid carrier;
co-spraying two dissimilar suspensions and said dry powder from said plasma spray gun; and
forming a coating on said surface of said substrate, said coating comprising splats of at least one of said ceramic particulate and dry particles introduced from said dry powder, said dry particles being larger than said ceramic particulate.

9. The process of claim 8, wherein said coating comprises at least one of a first layer on said surface and a second layer coupled to said first layer opposite said surface.

10. The process of claim 8, further comprising:
said two dissimilar suspensions and said dry powder being composed of dissimilar particles.

11. The process of claim 8, further comprising:
varying a morphology of said splats by at least one of selecting the coating materials with different melting points and selecting the coating materials with different particle sizes.

12. The process of claim 8, further comprising:
varying a thickness of at least one of a first layer of said coating and a second layer of said coating by at least one of changing a total solids loading and a particle size in the two dissimilar suspensions, individual feed rate of the two dissimilar suspensions, and changing a liquid carrier of the two dissimilar suspensions.

13. The process of claim 8, further comprising:
forming said coating by tailoring plasma parameters of said plasma spray gun responsive to said coating material.

14. The process of claim 8, further comprising:
forming said coating into a structure, said structure comprising at least one of a porous structure, a dense structure having vertical cracks, a dense structure, and a columnar structure.

* * * * *